(12) United States Patent
Jang

(10) Patent No.: US 8,521,328 B2
(45) Date of Patent: Aug. 27, 2013

(54) CONTROL SYSTEM FOR ROBOTIC VEHICLES

(75) Inventor: Jung Soon Jang, Bellevue, WA (US)

(73) Assignee: The Boeing Company, Chicago, IL (US)

(*) Notice: Subject to any disclaimer, the term of this patent is extended or adjusted under 35 U.S.C. 154(b) by 849 days.

(21) Appl. No.: 12/634,958

(22) Filed: Dec. 10, 2009

(65) Prior Publication Data
US 2011/0144802 A1    Jun. 16, 2011

(51) Int. Cl.
*G06F 9/00* (2006.01)

(52) U.S. Cl.
USPC .............................................. 700/245; 901/1

(58) Field of Classification Search
USPC ............ 700/245, 250, 253, 257; 318/568.13, 318/568.22; 901/1, 5, 15
See application file for complete search history.

(56) References Cited

U.S. PATENT DOCUMENTS

| | | | |
|---|---|---|---|
| 6,526,332 B2 * | 2/2003 | Sakamoto et al. | 700/259 |
| 6,816,753 B2 * | 11/2004 | Sakamoto et al. | 700/245 |
| 7,260,560 B2 * | 8/2007 | Herbrich et al. | 706/45 |
| 7,890,194 B2 * | 2/2011 | Pannese | 700/17 |
| 7,925,381 B2 * | 4/2011 | Murray et al. | 700/245 |

OTHER PUBLICATIONS

"Piccolo Highly Integrated Autopilots", Cloud Cap Technology, 1 page, retreived Oct. 30, 2009 http://www.cloudcaptech.com/piccolo_system.shtm.
"Fly Light", Procerus technologies: Kestrel Autopilot, pp. 1-3, retrieved Oct. 30, 2009 http://www.procerusuay.com/productsKestrelAutopilot.php.
"Microbot Autopilot Platform for Unmanned Vehicles", Microbotics, Inc., pp. 1-2, retrieved Oct. 30, 2009 http://microboticsinc.com/rc_uav_autopilot.html.

* cited by examiner

*Primary Examiner* — Dalena Tran
(74) *Attorney, Agent, or Firm* — Yee & Associates, P.C.

(57) ABSTRACT

A method and apparatus may be present for controlling robotic vehicles. A processor system may identify hardware for a robotic vehicle to form an identification. The processor system may run an interface layer for the hardware for the robotic vehicle using the identification. The interface layer may be configured to receive information from the hardware in which the information may be received using a number of protocols for the hardware. The processor system may send the information received from the hardware to a control layer in which a number of applications running in the control layer may be configured to indirectly control operation of the robotic vehicle. The information may be received in the control layer using a protocol used by the number of applications.

19 Claims, 11 Drawing Sheets

CONTROL SYSTEM FOR ROBOTIC VEHICLES

BACKGROUND INFORMATION

1. Field

The present disclosure relates generally to robotic vehicles and, in particular, to a system for controlling robotic vehicles. Still more particularly, the present disclosure relates to a system for controlling a number of robotic vehicles using a number of applications.

2. Background

A robotic vehicle may be a vehicle that moves without requiring a human operator to control the operation of the vehicle. A robotic vehicle may be, for example, without limitation, an unmanned aerial vehicle, an unmanned submersible vehicle, a cruise missile, a terrain mapping robotic vehicle, or some other suitable type of vehicle. The robotic vehicle may be controlled by a computer program running on a processor system. The processor system may be located in the robotic vehicle or in a location remote to the robotic vehicle. The processor system may send commands to the robotic vehicle. The robotic vehicle may perform a number of tasks based on these commands. These commands may be based on factors such as, for example, without limitation, input received from a human operator, decisions made using the computer program, rules in the computer program, and/or other suitable factors.

Further, a robotic vehicle also may be capable of generating and sending data to a processor system. The data may be, for example, without limitation, data from a sensor system in the robotic vehicle.

A number of hardware and/or software components may comprise a robotic vehicle. These components may be located in the robotic vehicle and/or in a location remote to the robotic vehicle. Further, these components may be tested and/or controlled by an exchange of information with a processor system. This exchange of information may be uni-directional and/or bi-directional. The processor system may be comprised of a number of computer systems with a number of hardware and/or software components.

With currently available processor systems used to test and/or control robotic vehicles, the hardware and/or software components in these processor systems may be customized for different robotic vehicles. In other words, the different hardware and/or software components may be limited in the number of different robotic vehicles and/or different components in the robotic vehicles with which the hardware and/or software components may interface.

Further, the development of robotic vehicles may involve designing and testing the different hardware and/or software components of the robotic vehicles. Currently available systems and processes for designing and testing these components may take more time, effort, and expense than desired.

Therefore, it would be advantageous to have a method and apparatus that addresses one or more of the issues discussed above, as well as possibly other issues.

SUMMARY

In one advantageous embodiment, an apparatus may comprise a control layer, an interface layer, and a processor system. The control layer may be configured to control hardware for a robotic vehicle by indirectly exchanging information with the hardware using a first protocol. The interface layer may be configured to exchange the information with the hardware and the control layer using a communications medium. The interface layer may exchange the information with the control layer using the first protocol and may exchange the information with the hardware using a number of protocols used by the hardware. The control layer, the communications medium, and the interface layer may run on the processor system.

In another advantageous embodiment, a control system for a robotic vehicle may comprise the robotic vehicle, hardware associated with the robotic vehicle, a processor system for use with the robotic vehicle, a control layer, an interface layer, and a processor system. The control layer may be configured to run on the processor system and to control the hardware for the robotic vehicle by indirectly exchanging information with the hardware using a first protocol. The control layer may comprise a number of applications configured to indirectly control the hardware using the first protocol and a communications process configured to exchange information with a communications medium. The interface layer may be configured to run on the processor system and exchange the information with the hardware and the control layer using the communications medium. The interface layer may exchange the information with the control layer using the first protocol and may exchange the information with the hardware using a number of protocols used by the hardware. The interface layer may comprise a map of the hardware, descriptions of how to communicate with the hardware, a number of processes configured to communicate with the hardware using the descriptions and the map, and a number of buffers. The number of processes may be configured to retrieve the information from the hardware and place the information in the number of buffers. The map of the hardware may identify a location of the hardware in the robotic vehicle. The descriptions of how to communicate with the hardware may comprise at least one of a packet size, a checksum, a data transfer rate, a device driver location, and an identification of the number of processes that communicate with the hardware. The control layer, the communications medium, and the interface layer may run on the processor system.

In yet another advantageous embodiment, a method may be present for controlling robotic vehicles. A processor system may identify hardware for a robotic vehicle to form an identification. The processor system may run an interface layer for the hardware for the robotic vehicle using the identification. The interface layer may be configured to receive information from the hardware in which the information may be received using a number of protocols for the hardware. The processor system may send the information received from the hardware to a control layer in which a number of applications running in the control layer may be configured to indirectly control operation of the robotic vehicle. The information may be received in the control layer using a protocol used by the number of applications.

In still yet another advantageous embodiment, a method may be present for controlling robotic vehicles using a control system. A processor system may identify hardware for a robotic vehicle to form an identification. The processor system may run an interface layer for hardware for the robotic vehicle using the identification. The interface layer may comprise a map of the hardware, descriptions of how to communicate with the hardware, a number of processes, and a number of buffers. The descriptions may comprise at least one of a packet size, a checksum, a data transfer rate, a device driver location, and an identification of the number of processes that communicate with the hardware. The number of processes may be configured to communicate with the hardware using the descriptions and the map. The number of processes may be configured to retrieve the information from the hardware and place the information in the number of buffers. The interface layer may be configured to receive information from the hardware in which the information may be received using a number of protocols for the hardware. The processor system may send the information received from the hardware and read from the number of buffers to a control layer over a communications medium using a protocol. The control layer may comprise a number of applications configured to indirectly control the hardware using the protocol and a communications process configured to exchange the information with the communications medium. The number of applications running in the control layer may be configured to indirectly control operation of the robotic vehicle. The information may be received using the protocol used by the number of applications. The processor system may receive the information in the interface layer from the number of applications in the control layer in which the information may be received in the protocol. The processor system may send the information received from the number of applications in the interface layer to the hardware using the number of protocols for the hardware.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
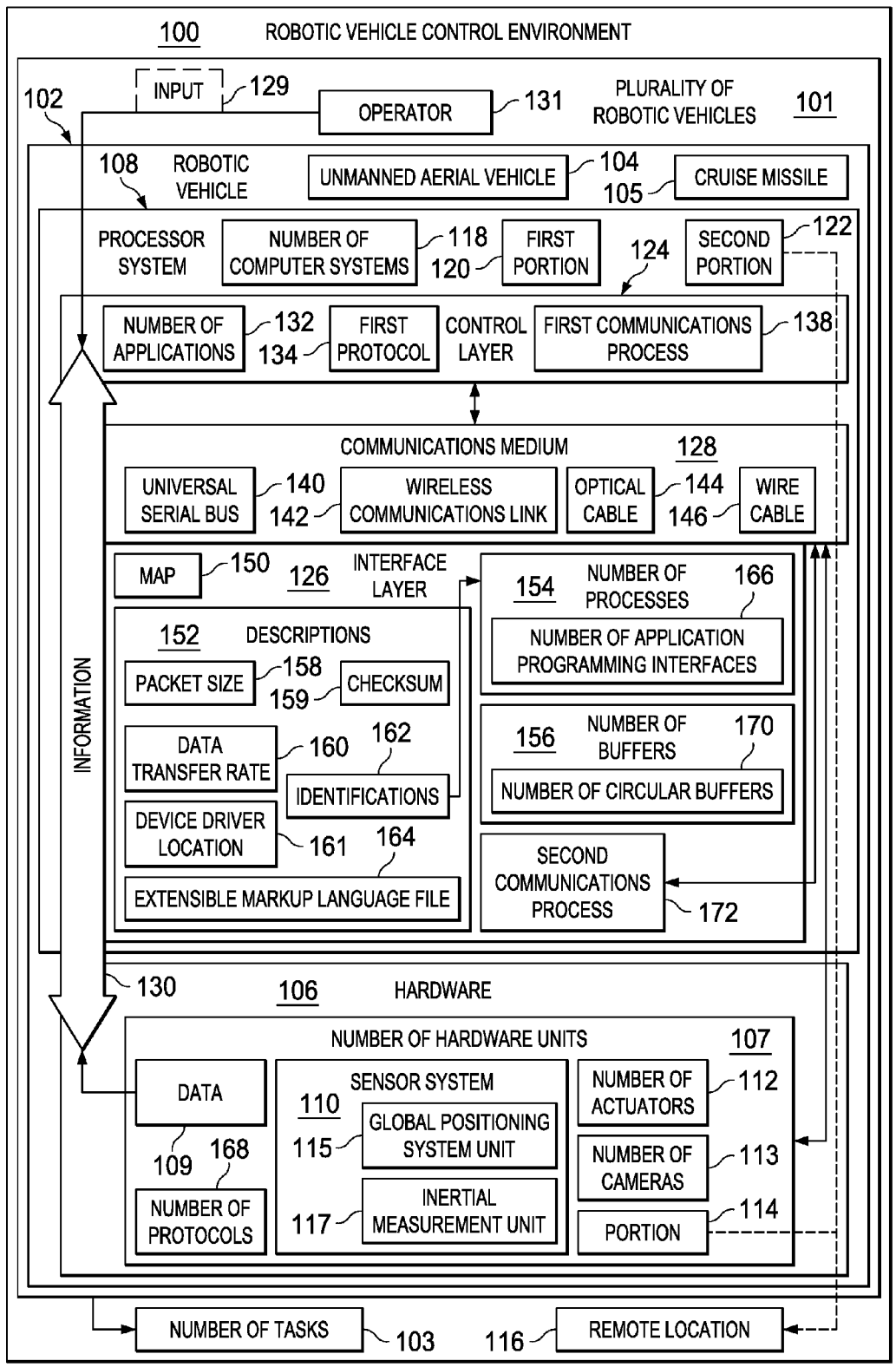
FIG. 1 is an illustration of a robotic system in accordance with an advantageous embodiment.

The different advantageous embodiments may recognize and take into account a number of different considerations. For example, without limitation, the different advantageous embodiments recognize and take into account that testing prototype robotic vehicles in different testing environments may require different types of equipment. The different advantageous embodiments recognize and take into account that the hardware components for a robotic vehicle used to test the robotic vehicle in an indoor environment, such as a lab, may be different than the hardware components used to test the robotic vehicle in an outdoor environment.

Further, the different advantageous embodiments also may recognize and take into account that the hardware components for the robotic vehicle may also be different when the robotic vehicle is in operation. For example, without limitation, different types of tasks may require different types of sensors, communications links, and/or other suitable hardware components.

The different advantageous embodiments recognize and take into account that changing the hardware components for a robotic vehicle, based on the testing environment, may require changes in the software used to perform the testing of the robotic vehicle. These changes in software may take more time, effort, and expense than desired. Further, these changes may increase the time it takes to bring the robotic vehicle from the prototype stage into use. The software may be, for example, without limitation, a number of applications.

Further, the different advantageous embodiments recognize and take into account that some tasks and/or missions may be performed by swarms of robotic vehicles. A swarm of robotic vehicles may be a plurality of robotic vehicles configured to perform a task and/or mission at the same time. The task and/or mission may be performed in coordination with other robotic vehicles in the swarm.

The swarms of robotic vehicles may be homogeneous or heterogeneous. When testing heterogeneous swarms of robotic vehicles, the development of software applications for testing and/or controlling all of the different robotic vehicles may take more time, effort, and expense than desired with currently available systems.

The different advantageous embodiments recognize and take into account that it may be desirable to have a software architecture for controlling robotic vehicles that does not need to take into account the particular hardware and/or software components of the robotic vehicles. For example, the hardware used in a test environment for a robotic vehicle may be different from the hardware used in a field environment for the robotic vehicle. Thus, it may be desirable to have software architecture for running a number of applications in which the development of the number of applications may not depend on the particular hardware components being used in controlling the robotic vehicle in different environments.

For example, without limitation, the different advantageous embodiments may recognize and take into account that the hardware and/or software components of currently available processor systems used with robotic vehicles may be limited. The components may not be reusable or expandable. In other words, the components may not be used for different robotic vehicles and/or different components in robotic vehicles. Further, the components in the processor systems may not be modular or capable of modifications that expand the components. For example, without limitation, software components in the processor systems may be limited in the amount of modifications that may be performed or the number of new modules that may be added to the programming.

The different advantageous embodiments may take into account and recognize that it may be desirable to have a processor system configured to interface with a variety of hardware and/or software components in robotic vehicles and/or a variety of robotic vehicles. One component may interface with another component by being connected to each other such that information may be exchanged between both components. This connection may be a wired connection, a wireless connection, a connector to port connection, and/or some other suitable type of connection.

The different advantageous embodiments may recognize and take into account that having a processor system configured to interface with a variety of components in robotic vehicles and with a variety of robotic vehicles may reduce the time, effort, and expense of controlling the robotic vehicles. For example, without limitation, operators may be able to use one processor system to make modifications to a number of applications running on the processor system without taking into account the protocols used by the components of the robotic vehicles interfaced with the processor system.

Thus, the different advantageous embodiments may provide a method and apparatus for controlling robotic vehicles. In one advantageous embodiment, a processor system may identify hardware for a robotic vehicle to form an identification. The processor system may then run an interface layer for the hardware for the robotic vehicle using the identification. The interface layer may be configured to receive information from the hardware. The information may be received using a number of protocols for the hardware. The processor system may send the information received from the hardware using the interface layer to a control layer in which a number of applications running in the control layer may be configured to indirectly control operation of the robotic vehicle. The information may be received in the control layer using a protocol used by the number of applications.

With reference now to FIG. 1, an illustration of a robotic system is depicted in accordance with an advantageous embodiment. In this illustrative example, robotic vehicle control environment 100 may include plurality of robotic vehicles 101.

Plurality of robotic vehicles 101 may be homogeneous or heterogeneous. In other words, plurality of robotic vehicles 101 may include robotic vehicles of the same type or of different types. The type of robotic vehicle may be based on factors such as, for example, without limitation, the hardware and/or software components for the robotic vehicle, the configuration of these components, the tasks for which the robotic vehicle may be configured, the type of programming for the robotic vehicle, and/or other suitable factors. For example, without limitation, in some advantageous embodiments, plurality of robotic vehicles 101 may include different types of robotic vehicles configured to perform substantially the same types of tasks.

In these illustrative examples, plurality of robotic vehicles 101 may be configured to perform number of tasks 103 for a mission. A mission may be any selection of tasks in number of tasks 103. Number of tasks 103 may include, for example, without limitation, surveillance tasks, reconnaissance tasks, weapons deployment tasks, repair tasks, machining tasks, other suitable types of tasks, and/or combinations of tasks.

For example, without limitation, number of tasks 103 may include traveling to a location, performing surveillance, repairing a target object, returning to a base, and/or some other suitable types of task.

In these illustrative examples, plurality of robotic vehicles 101 may have different levels of complexity. The levels of complexity may depend on the type of programming for the robotic vehicles and/or the type of number of tasks 103.

The levels of complexity may also depend on the health of plurality of robotic vehicles 101. If, for example, the health of one or more of robotic vehicles 101 decreases, the complexity of tasks that can be performed also may decrease. The health status of a robotic vehicle may be the capability of the robotic vehicle to perform certain tasks in a desired manner. For example, without limitation, the health status of a robotic vehicle may include a sensor range, a climb rate, a payload capacity, and/or other suitable parameters for health. Tasks within number of tasks 103 may be distributed among plurality of robotic vehicles 101 based on the health status of plurality of robotic vehicles 101.

Robotic vehicle 102 may be a robotic vehicle in plurality of robotic vehicles 101. Robotic vehicle 102 may take the form of, for example, without limitation, unmanned aerial vehicle 104, cruise missile 105, and/or some other suitable type of robotic vehicle.

In this illustrative example, robotic vehicle 102 may have hardware 106 and processor system 108. Hardware 106 may include number of hardware units 107 such as, for example, without limitation, sensor system 110, number of actuators 112, number of cameras 113, and/or other suitable types of hardware units. Sensor system 110 may include a number of sensors such as, for example, without limitation, global positioning system unit 115, inertial measurement unit 117, and/or other suitable types of sensors.

Number of hardware units 107 may be configured to process data 109, convert data 109 into a digital format, and exchange data 109 with processor system 108. In these depicted examples, number of hardware units 107 may be configured by processor system 108 to process, convert, and/or exchange data 109. In these illustrative examples, the exchange of data 109 may be unidirectional or bi-directional. As one example, global positioning system unit 115 may generate data 109 in the form of position data. Global positioning system unit 115 may process the position data, convert the position data into a digital format, and send the position data into processor system 108.

In some advantageous embodiments, portion 114 of number of hardware units 107 may be located in remote location 116. Remote location 116 may be a location remote to robotic vehicle 102. As one example, sensor system 110 may be located in remote location 116. In another example, portion 114 may include hardware units that may be used for testing robotic vehicle 102. These hardware units may be in remote location 116 such that an operator may perform testing on robotic vehicle 102 from remote location 116.

In this illustrative example, hardware 106 for robotic vehicle 102 may be controlled by processor system 108. Processor system 108 may take the form of number of computer systems 118. A number, when referring to items, means one or more items. For example, a number of apparatus embodiments are one or more apparatus embodiments. Number of computer systems 118 may be located in robotic vehicle 102 and/or remote location 116. For example, without limitation, first portion 120 of processor system 108 may be located in robotic vehicle 102, while second portion 122 of processor system 108 may be located in remote location 116.

In this illustrative example, processor system 108 may include control layer 124, interface layer 126, and communications medium 128. Control layer 124 may control hardware 106 for robotic vehicle 102 by exchanging information 130 with hardware 106. Information 130 may be exchanged by sending, receiving, and/or sending and receiving information 130. In other words, the exchange of information 130 in these illustrative examples may be unidirectional or bi-directional. As depicted, control layer 124 may indirectly exchange information 130 with hardware 106. An indirect exchange means that information 130 may be exchanged between control layer 124 and hardware 106 using another layer. In these illustrative examples, layers may be processes that run on a processor unit. The layers also may include data and/or data structures. In these examples, the layers may exclude hardware components.

Information 130 may include, for example, without limitation, data, logs, files, messages, commands, code, programs, pictures, and/or other suitable types of information. Further, information 130 may include input 129 received from an operator, such as operator 131.

In this illustrative example, input 129 may be for number of applications 132 in control layer 124. In some examples, number of applications 132 may be modified by input 129 received from operator 131. For example, without limitation, operator 131 may add, change, and/or remove portions of number of applications 132 with input 129.

Control layer 124 may indirectly exchange information 130 with hardware 106 using interface layer 126. Control layer 124 may control hardware 106 using number of applications 132. In particular, number of applications 132 may communicate with interface layer 126 using first protocol 134. For example, number of applications 132 may communicate with interface layer 126 by exchanging information 130 with interface layer 126. First protocol 134 may be a protocol separate from the protocols used by number of hardware units 107. In this manner, modifications may be made to number of applications 132 without taking into account the protocols used by number of hardware units 107.

In these illustrative examples, a protocol may be a set of rules used for exchanging information that may be implemented by hardware and/or software. A protocol may be the rules for the syntax, semantics, and/or synchronization of communications. In other words, first protocol 134 may be a set of rules for exchanging information between control layer 124 and interface layer 126.

In this illustrative example, control layer 124 may exchange information 130 with interface layer 126 using communications medium 128. In particular, control layer 124 may exchange information 130 with communications medium 128 using first communications process 138 in control layer 124. Further, information 130 may be exchanged between control layer 124 and interface layer 126 over communications medium 128 using first protocol 134. Communications medium 128 may include at least one of, for example, without limitation, universal serial bus 140, wireless communications link 142, optical cable 144, wire cable 146, and/or some other suitable type of communications medium.

In this depicted example, interface layer 126 may include map 150, descriptions 152, number of processes 154, and number of buffers 156. Number of processes 154 may use map 150 and descriptions 152 to communicate with hardware 106. In this illustrative example, map 150 may be a map of hardware 106 for robotic vehicle 102. For example, without limitation, map 150 may identify locations of number of hardware units 107 for robotic vehicle 102. These identifications may include slot numbers, port numbers, connector positions, and/or other types of identifications of locations for number of hardware units 107.

Descriptions 152 may include descriptions of how to communicate with hardware 106. For example, without limitation, descriptions 152 may include packet size 158, checksum 159, data transfer rate 160, device driver location 161, identifications 162, and/or other suitable types of information describing how to communicate with hardware 106. Identifications 162 may identify number of processes 154 that communicate with hardware 106.

Further, descriptions 152 may also include extensible markup language (XML) file 164. Information 130 exchanged between control layer 124 and hardware 106 may be coded and/or decoded by interface layer 126 using extensible markup language file 164.

For example, without limitation, information 130 in an extensible markup language format may be decoded using extensible markup language file 164 into a format capable of being processed by number of hardware units 107. In this manner, information 130 received from control layer 124 may not need to take into account the type of format for information 130 that may be processed by number of hardware units 107.

Number of processes 154 may use map 150 and descriptions 152 to identify which process in number of processes 154 to use to access a particular hardware unit in number of hardware units 107. For example, without limitation, map 150 may be used to identify a location of the connection of number of cameras 113 to processor system 108. This connection may be made using communications medium 128 in these examples.

Further, descriptions 152 may be used to determine how to communicate with number of cameras 113, retrieve information 130 from number of cameras 113, send commands to control the manner in which information 130 may be generated by number of cameras 113, and/or perform other suitable exchanges of information 130 with number of cameras 113. With descriptions 152, number of processes 154 may identify a process within number of processes 154 that may be configured to access number of cameras 113 and retrieve information 130.

In this illustrative example, number of processes 154 may take the form of number of application programming interfaces 166. Interface layer 126 may exchange information 130 with hardware 106 using number of application programming interfaces 166 and number of protocols 168. In this depicted example, number of protocols 168 may be protocols used by number of hardware units 107 for robotic vehicle 102.

Information 130 retrieved by interface layer 126 from hardware 106 may be placed in number of buffers 156 in interface layer 126 by number of processes 154. In this illustrative example, number of buffers 156 may be number of circular buffers 170. The buffers in number of buffers 156 corresponding to a particular hardware unit in number of hardware units 107 may be identified using descriptions 152 in this illustrative example. In other advantageous embodiments, number of buffers 156 may take the form of a number of first-in-first-out buffers and/or some other suitable type of buffer.

Interface layer 126 may also include second communications process 172. Second communications process 172 may read information 130 placed in number of buffers 156. Further, second communications process 172 may send information 130 read from number of buffers 156 to control layer 124 over communications medium 128 using first protocol 134. First protocol 134 may be separate from number of protocols

168. In this manner, control layer 124 may receive information 130 from hardware 106 without taking into account the different protocols in number of protocols 168 for the different hardware units in number of hardware units 107.

Thus, the configuration of processor system 108 with control layer 124 and interface layer 126 may allow the development of robotic vehicle 102 with less time, effort, and expense as compared to currently available control systems for robotic vehicles. Processor system 108 may be used to integrate testing in a controlled environment, such as a lab, with testing in the field. For example, without limitation, number of applications 132 may be run for testing robotic vehicle 102 for a variety of hardware units and/or algorithms for robotic vehicle 102. These algorithms may include, for example, without limitation, search algorithms, collision avoidance algorithms, mission management algorithms, task allocation algorithms, and/or other suitable types of algorithms.

As one illustrative example, one type of sensor system 110 may be in remote location 116 for testing robotic vehicle 102 in a lab. Another type of sensor system 110 may be connected to robotic vehicle 102 for testing robotic vehicle 102 in the field. The programming for number of applications 132 may not need to be rewritten to take into account the different sensor systems used for testing. Operator 131 may add information to map 150 and/or descriptions 152 to account for the change in sensor systems.

In this manner, operator 131, who may be a programmer, may focus on developing and operating robotic vehicle 102 without having knowledge of the interfacing capabilities of number of hardware units 107. Further, operator 131 may focus on writing software for number of applications 132 to test and/or control the performance of number of tasks 103 by robotic vehicle 102. As a result, less time, effort, and expense may be spent developing robotic vehicle 102.

The illustration of robotic vehicle control environment 100 in FIG. 1 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, other portions of processor system 108 may be located in locations other than robotic vehicle 102 and/or remote location 116. In other advantageous embodiments, number of hardware units 107 may include analog to digital converters, analog devices, tools, and/or other suitable types of hardware units. Further, in some advantageous embodiments, other robotic vehicles in plurality of robotic vehicles 101 in addition to robotic vehicle 102 may be controlled using a processor system, such as processor system 108.

Figure 2:
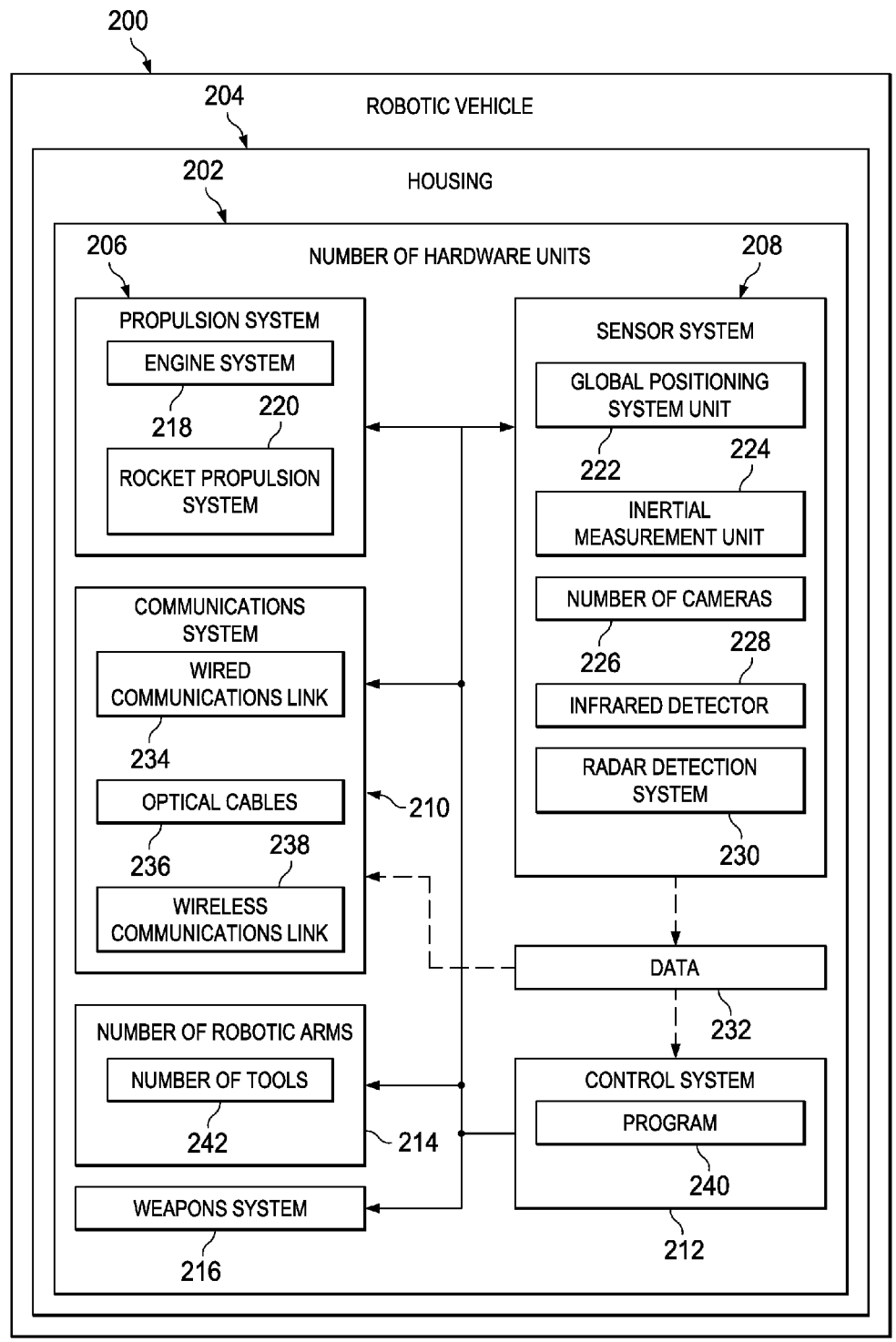
FIG. 2 is an illustration of a robotic vehicle in accordance with an advantageous embodiment.

With reference now to FIG. 2, an illustration of a robotic vehicle is depicted in accordance with an advantageous embodiment. In this illustrative example, robotic vehicle 200 may be an example of one implementation of robotic vehicle 102 in FIG. 1. As depicted, robotic vehicle 200 may have number of hardware units 202. Number of hardware units 202 may be located within housing 204.

In this illustrative example, number of hardware units 202 may include, for example, without limitation, propulsion system 206, sensor system 208, communications system 210, control system 212, number of robotic arms 214, weapons system 216, and/or other suitable types of hardware units. In this depicted example, propulsion system 206 may allow robotic vehicle 200 to move on land and/or in the air. Propulsion system 206 may take the form of engine system 218, rocket propulsion system 220, and/or some other suitable type of propulsion system.

Sensor system 208 may include a number of sensors such as, for example, without limitation, global positioning system unit 222, inertial measurement unit 224, number of cameras 226, infrared detector 228, radar detection system 230, and/or other suitable types of sensors. Sensor system 208 may be configured to generate data 232. In some examples, data 232 may be generated in response to testing of robotic vehicle 200 and/or in response to robotic vehicle 200 performing a number of tasks. In this illustrative example, data 232 may be processed by control system 212 and/or processed at a location remote to robotic vehicle 200.

In this illustrative example, communications system 210 may be used by robotic vehicle 200 to communicate with computer systems remote to robotic vehicle 200. Communications system 210 may include at least one of wired communications link 234, optical cables 236, wireless communications link 238, and/or some other suitable form of communications. In one illustrative example, communications system 210 may be used to send data 232 generated by sensor system 208 to a computer system located remote to robotic vehicle 200 for processing.

In this depicted example, control system 212 may control operation of robotic vehicle 200. Control system 212 may take the form of a computer system in this illustrative example. Control system 212 may run program 240 to control operation of robotic vehicle 200. Robotic vehicle 200 may have different levels of complexity, depending on program 240. For example, without limitation, robotic vehicle 200 may be capable of making decisions, learning, and/or analyzing situations. In this example, program 240 may include artificial intelligence, a neural network, and/or some other suitable form of programming.

In another example, robotic vehicle 200 may be capable of responding to commands received from a human operator. In this example, robotic vehicle 200 may not be capable of making decisions and/or learning and may have a simpler program 240 as compared to a robotic vehicle with artificial intelligence and/or neural networks.

In this illustrative example, control system 212 may run program 240 to control operation of propulsion system 206, sensor system 208, communications system 210, number of robotic arms 214, and/or weapons system 216. For example, without limitation, number of robotic arms 214 may be connected to number of tools 242. Control system 212 may run program 240 to control the operation of number of tools 242 to perform a number of tasks. In another illustrative example, control system 212 may run program 240 to control weapons system 216 such that a weapon may be deployed based on decisions made by control system 212.

Figure 3:
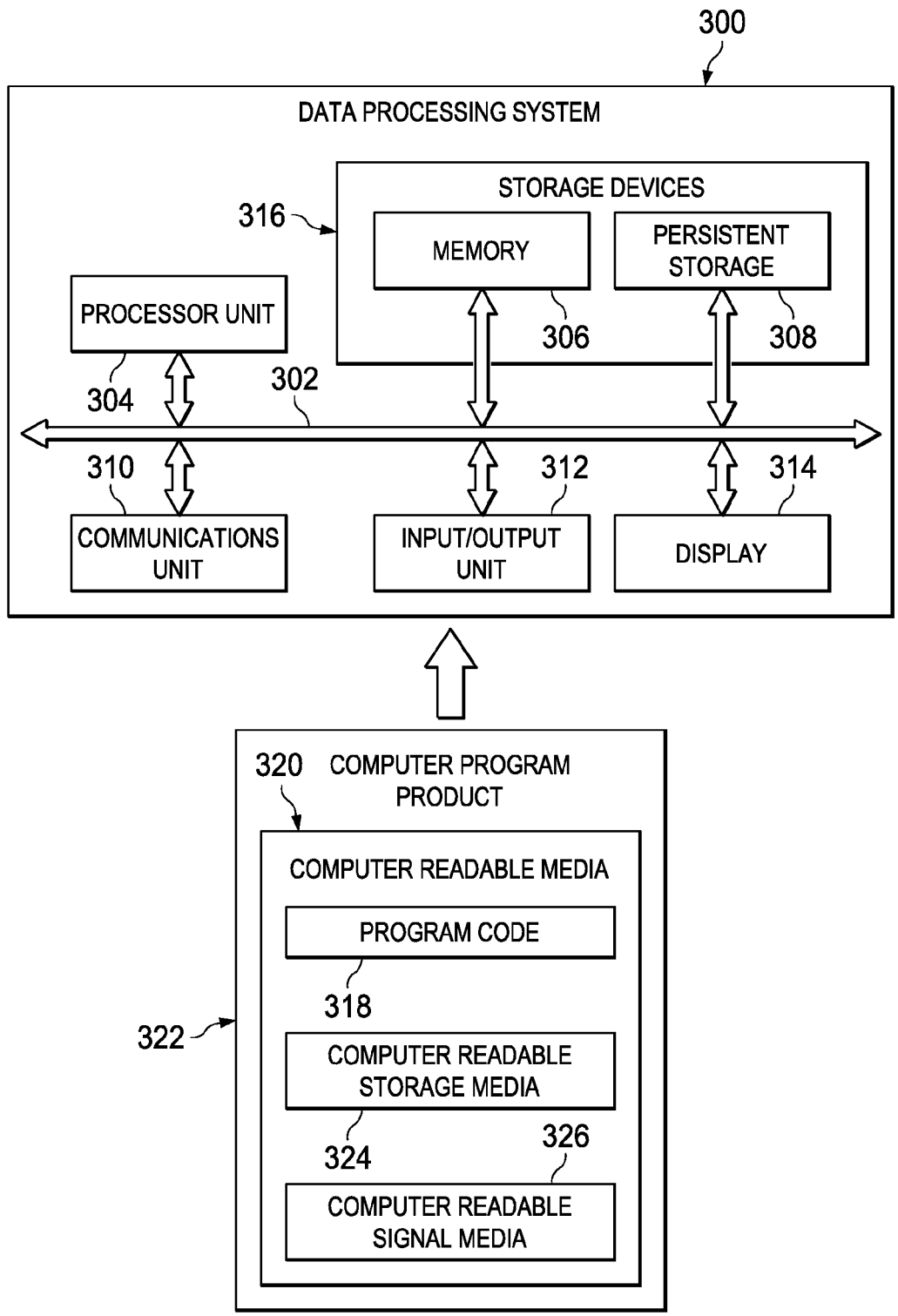
FIG. 3 is an illustration of a data processing system in accordance with an advantageous embodiment.

Turning now to FIG. 3, an illustration of a data processing system is depicted in accordance with an advantageous embodiment. In this illustrative example, data processing system 300 may be an example of one implementation for processor system 108 in FIG. 1. Further, data processing system 300 may be an example of one implementation for control system 212 in FIG. 2. As depicted, data processing system 300 may include communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices 316. A storage device is any piece of hardware that is capable of storing information such as, for example, without limitation, data, program code in functional form, and/or other suitable information either on a temporary basis and/or a permanent basis.

Memory 306, in these examples, may be, for example, a random access memory or any other suitable volatile or non-volatile storage device. Persistent storage 308 may take various forms, depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 may be removable. For example, a removable hard drive may be used for persistent storage 308.

Communications unit 310, in these examples, provides for communication with other data processing systems or devices. In these examples, communications unit 310 is a network interface card. Communications unit 310 may provide communications through the use of either or both physical and wireless communications links.

Input/output unit 312 may allow for the input and output of data with other devices that may be connected to data processing system 300. For example, input/output unit 312 may provide a connection for operator input through a keyboard, a mouse, a personal digital assistant (PDA), a data glove, and/or some other suitable input device. Further, input/output unit 312 may send output to a printer. Display 314 provides a mechanism to display information to an operator.

Instructions for the operating system, applications, and/or programs may be located in storage devices 316, which are in communication with processor unit 304 through communications fabric 302. In these illustrative examples, the instructions are in a functional form on persistent storage 308. These instructions may be loaded into memory 306 for execution by processor unit 304. The processes of the different embodiments may be performed by processor unit 304 using computer implemented instructions, which may be located in a memory, such as memory 306.

These instructions are referred to as program code, computer usable program code, or computer readable program code that may be read and executed by a processor in processor unit 304. The program code, in the different embodiments, may be embodied on different physical or computer readable storage media, such as memory 306 or persistent storage 308.

Program code 318 is located in a functional form on computer readable media 320 that is selectively removable and may be loaded onto or transferred to data processing system 300 for execution by processor unit 304. Program code 318 and computer readable media 320 form computer program product 322. In one example, computer readable media 320 may be computer readable storage media 324 or computer readable signal media 326. Computer readable storage media 324 may include, for example, an optical or magnetic disk that is inserted or placed into a drive or other device that is part of persistent storage 308 for transfer onto a storage device, such as a hard drive, that is part of persistent storage 308. Computer readable storage media 324 also may take the form of a persistent storage, such as a hard drive, a thumb drive, or a flash memory that is connected to data processing system 300. In some instances, computer readable storage media 324 may not be removable from data processing system 300.

Alternatively, program code 318 may be transferred to data processing system 300 using computer readable signal media 326. Computer readable signal media 326 may be, for example, a propagated data signal containing program code 318. For example, computer readable signal media 326 may be an electromagnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some illustrative embodiments, program code 318 may be downloaded over a network to persistent storage 308 from another device or data processing system through computer readable signal media 326 for use within data processing system 300. For instance, program code stored in a computer readable storage media in a server data processing system may be downloaded over a network from the server to data processing system 300. The data processing system providing program code 318 may be a server computer, a client computer, or some other device capable of storing and transmitting program code 318.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown. The different embodiments may be implemented using any hardware device or system capable of executing program code. As one example, data processing system 300 may include organic components integrated with inorganic components and/or may be comprised entirely of organic components excluding a human being. For example, a storage device may be comprised of an organic semiconductor.

As another example, a storage device in data processing system 300 is any hardware apparatus that may store data. Memory 306, persistent storage 308, and computer readable media 320 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache such as found in an interface and memory controller hub that may be present in communications fabric 302.

Figure 4:
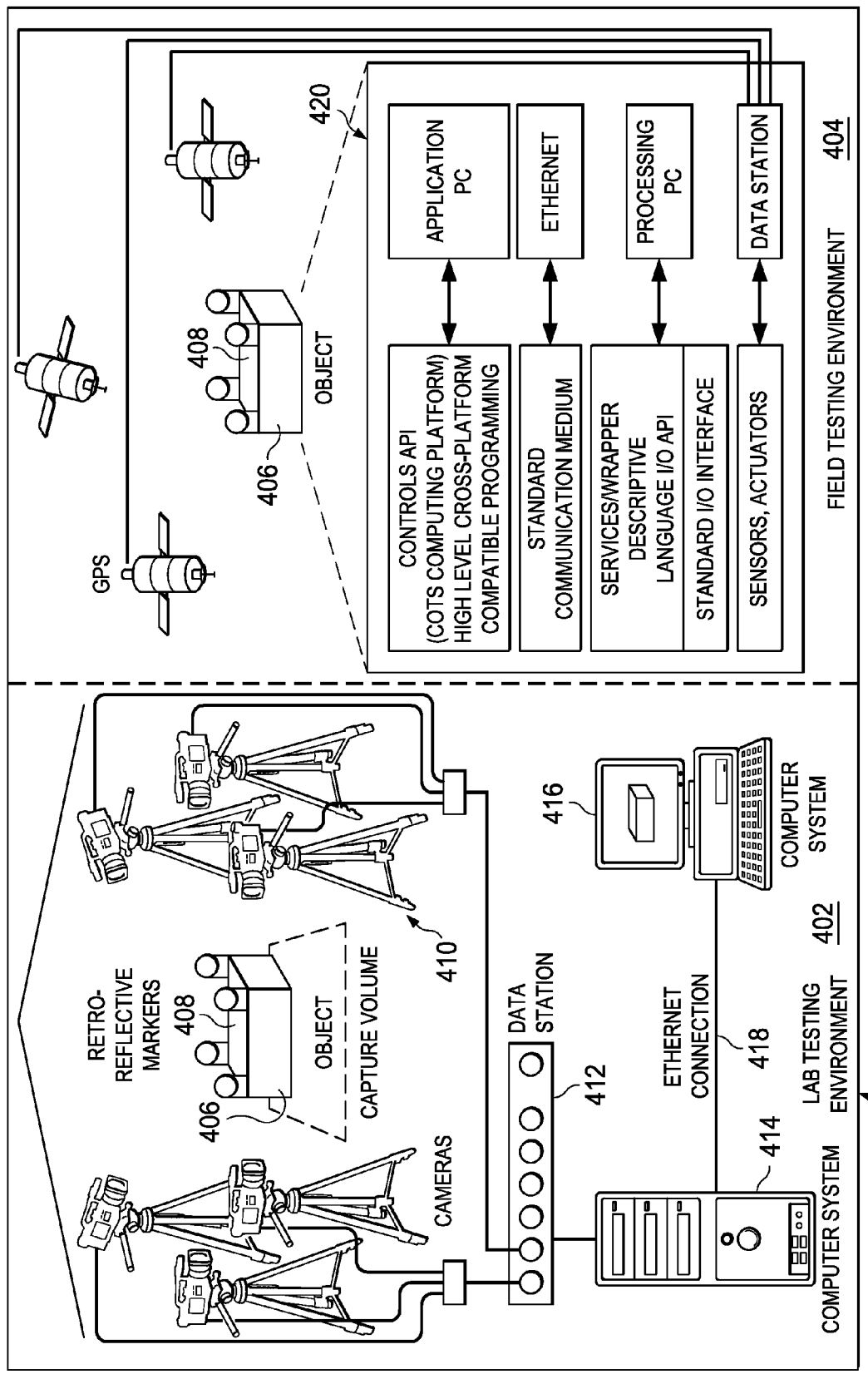
FIG. 4 is an illustration of a testing environment in accordance with an advantageous embodiment.

With reference now to FIG. 4, an illustration of a testing environment is depicted in accordance with an advantageous embodiment. In this illustrative example, testing environment 400 may be an example of one implementation for robotic vehicle control environment 100 in FIG. 1. As depicted, testing environment 400 may include lab testing environment 402 and field testing environment 404. Lab testing environment 402 may be indoors, while field testing environment 404 may be outdoors.

In this illustrative example, lab testing environment 402 and field testing environment 404 may be used to perform testing for object 406. In this depicted example, object 406 may take the form of robotic vehicle 408. Robotic vehicle 408 may be implemented in the form of robotic vehicle 102 in FIG. 1 and/or robotic vehicle 200 in FIG. 2.

Lab testing environment 402 may include a number of components for testing robotic vehicle 408. For example, without limitation, lab testing environment 402 may include number of cameras 410, data station 412, computer system 414, and computer system 416. Data station 412 may be used to collect data generated by number of cameras 410. This data may be in the form of images and/or videos. The data may be generated in response to a test performed on robotic vehicle 408.

In this illustrative example, number of cameras 410 may form a motion capture system. This motion capture system may identify particular patterns for robotic vehicle 408 during movement of robotic vehicle 408. For example, without limitation, number of cameras 410 may identify markers on robotic vehicle 408 while robotic vehicle 408 moves. Number of cameras 410 may be used to provide position information for robotic vehicle 408. Number of cameras 410 may be configured to provide position information for robotic vehicle 408 in real time. The position information may include a number of positions for robotic vehicle 408 in three-dimensional space.

Data station 412 may be connected to computer system 414. Computer system 414 may be configured to process the data generated by number of cameras 410. Computer system 414 may be linked to computer system 416 by wired communications link 418 in the form of an Ethernet cable. The processed data may be sent to computer system 416 over wired communications link 418 for further processing and/or analyzing. For example, without limitation, an operator may view the data processed by computer system 414 at computer system 416. The operator may make changes to the software and/or hardware components (not shown) for robotic vehicle 408 based on the processed data.

In this illustrative example, robotic vehicle 408 may be placed in field testing environment 404 for further testing. For example, without limitation, when robotic vehicle 408 takes the form of an unmanned aerial vehicle, robotic vehicle 408 may be placed into field testing environment 404 to test flying capabilities that cannot be tested in lab testing environment 402.

As depicted, robotic vehicle 408 may have processor system 420. Processor system 420 may be configured to control operation of robotic vehicle 408. Further, processor system 420 may be configured such that processor system 420 may include the functions provided by data station 412, computer system 414, computer system 416, and wired communications link 418. In other words, processor system 420 may be configured to collect data from hardware units for robotic vehicle 408, process the data, and send the data for further processing. The data may be sent using a wireless communications link in robotic vehicle 408 in this illustrative example.

In this illustrative example, processor system 420 may have an interface layer and control layer, such as interface layer 126 and control layer 124 in FIG. 1. With this type of configuration for processor system 420, an operator may make modifications to a number of applications running on processor system 420 without needing to take into account the hardware and/or software components of robotic vehicle 408. Further, robotic vehicle 408 may be tested in both lab testing environment 402 and field testing environment 404 without requiring modifications to the hardware and/or software components of robotic vehicle 408. In this manner, testing in both lab testing environment 402 and field testing environment 404 may be integrated through the use of processor system 420.

Figure 5:
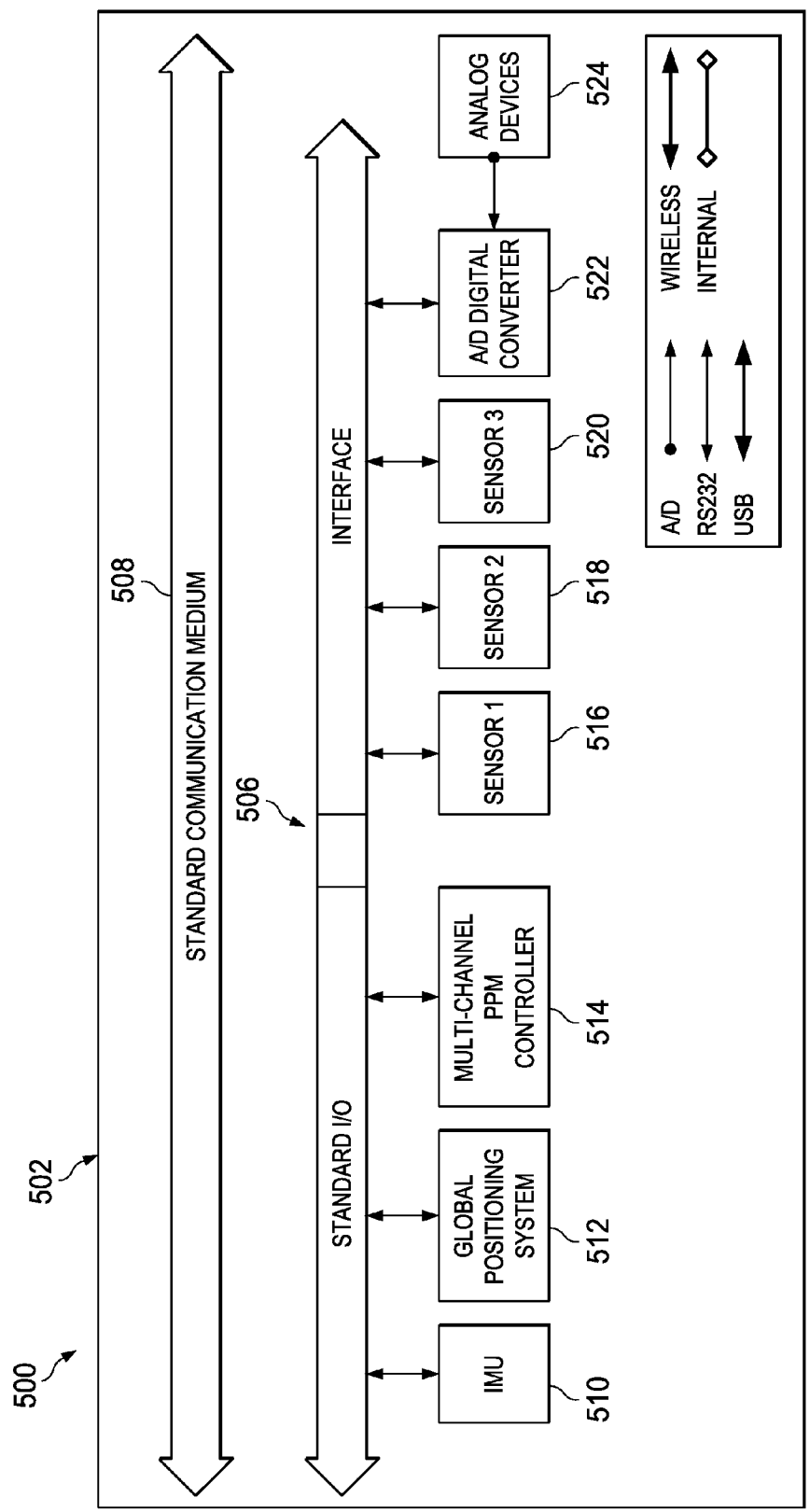
FIG. 5 is an illustration of a communications environment in accordance with an advantageous embodiment.

With reference now to FIG. 5, an illustration of a communications environment is depicted in accordance with an advantageous embodiment. In this illustrative example, robotic vehicle control environment 500 may be an example of one implementation of a portion of robotic vehicle control environment 100 in FIG. 1. Further, robotic vehicle control environment 500 may be implemented for a robotic vehicle, such as robotic vehicle 200 in FIG. 2. In particular, robotic vehicle control environment 500 may be used to control number of hardware units 202 for robotic vehicle 200.

The configuration of robotic vehicle control environment 500 may be one of a number of possible configurations. Robotic vehicle control environment 500 may include number of hardware units 502, interface layer 506, and communications medium 508.

Number of hardware units 502 may be an example of one implementation for number of hardware units 107 in FIG. 1 and/or number of hardware units 202 in FIG. 2. As depicted, number of hardware units 502 may include, without limitation, inertial measurement unit 510, global positioning system unit 512, multi-channel pulse position modulation (PPM) controller 514, sensor 1 516, sensor 2 518, sensor 3 520, analog to digital converter 522, and analog devices 524.

In this illustrative example, number of hardware units 502 may connect to interface 506. Interface may be an input/output interface configured to provide an interface between number of hardware units 502 and a processor system, such as processor system 108 in FIG. 1. As depicted, number of hardware units 502 connected to interface 506 may exchange information with the processor system over communications medium 508. Number of hardware units 502 may receive and/or send information over communications medium 508 through interface 506. In other illustrative embodiments, one of number of hardware units 502 may exchange information with the processor system directly over communications medium 508 without connecting to interface 506.

Figure 6:
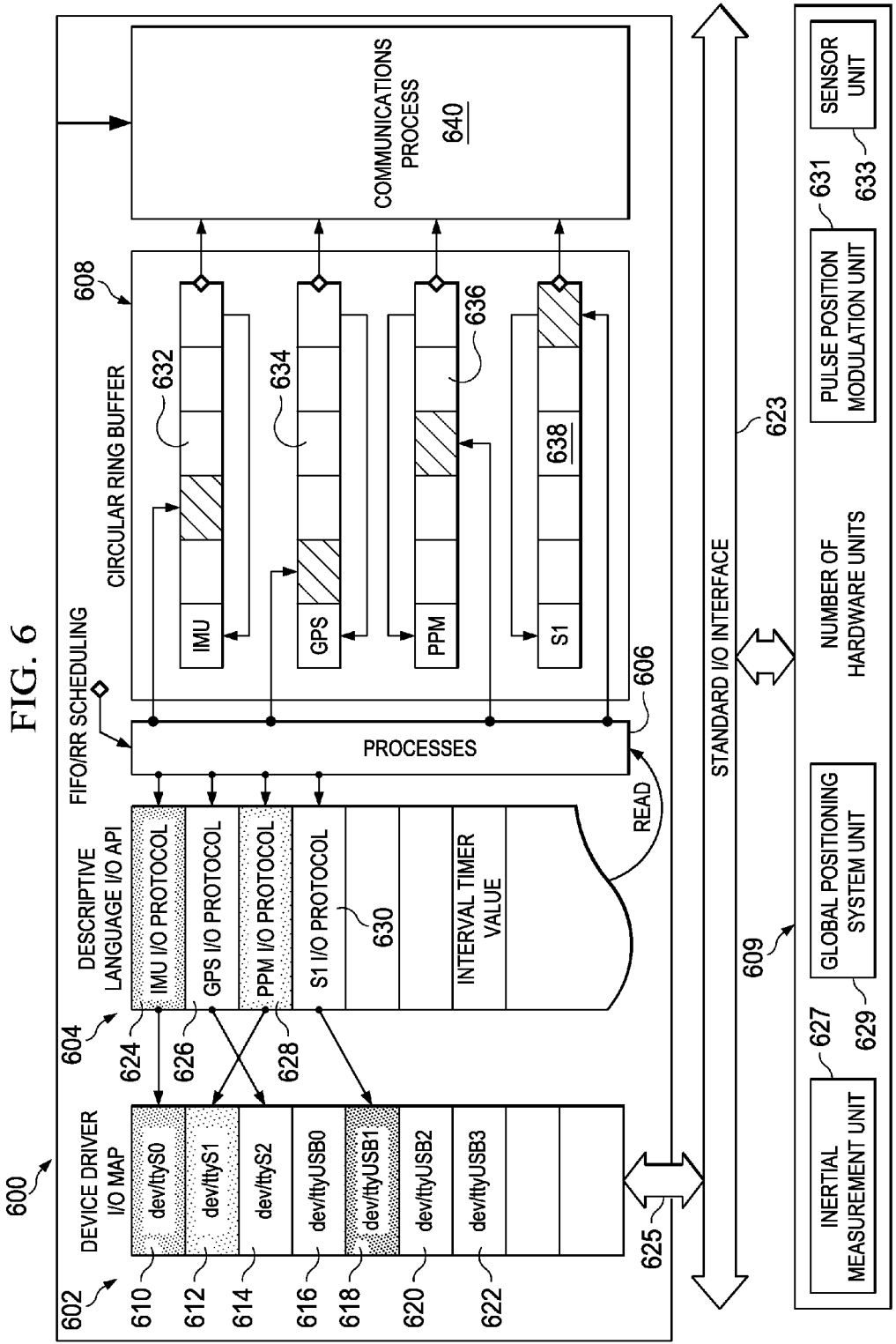
FIG. 6 is an illustration of an interface layer in accordance with an advantageous embodiment.

With reference now to FIG. 6, an illustration of an interface layer is depicted in accordance with an advantageous embodiment. In this illustrative example, interface layer 600 may be an example of one implementation of interface layer 126 in FIG. 1. Further, interface layer 600 may be implemented within control system 212 in robotic vehicle 200 in FIG. 2. As depicted, interface layer 600 may include map 602, descriptions 604, processes 606, and circular buffers 608.

In this illustrative example, map 602 may be an example of one implementation for map 150 in FIG. 1. Map 602 may provide identifications for locations of port numbers for number of hardware units 609. Number of hardware units 609 may be number of hardware units 502 in FIG. 5. For example, without limitation, map 602 may provide identifications of slot numbers and universal serial bus port numbers to which number of hardware units 609 may be connected. Locations 610, 612, and 614 may identify slot numbers. Locations 616, 618, 620, and 622 may identify universal serial bus port numbers.

In this illustrative example, map 602 may be generated in a number of different ways. As one example, map 602 may be generated by input received from an operator. In another example, map 602 may be generated by a process in interface layer 600 that polls number of hardware units 609 though interface 623 to identify the locations of number of hardware units 609. In this example, interface 623 may be an input/output interface that includes the slots and/or universal serial bus ports to which number of hardware units 609 may be connected. Further, interface layer 600 may communicate with number of hardware units 609 connected to interface 623 using communications medium 625.

As depicted, descriptions 604 may provide descriptions for how interface layer 600 may communicate with number of hardware units 609 connected to interface 623. This communication may include exchanging information between interface layer 600 and number of hardware units 609 connected to interface 623. For example, without limitation, inertial measurement unit protocol 624 may provide a description for how interface layer 600 may communicate with inertial measurement unit 627 in number of hardware units 609. Global positioning system unit protocol 626 may provide a description for how interface layer 600 may communicate with global positioning system unit 629 in number of hardware units 609. Pulse position modulation unit protocol 628 may provide a description of how interface layer 600 may communicate with pulse position modulation unit 631 in number of hardware units 609. Sensor 1 unit protocol 630 may provide a description of how interface layer 600 may communicate with sensor unit 633 in number of hardware units 609.

In this illustrative example, interface layer 600 may use map 602 and descriptions 604 to determine which process in processes 606 to use to communicate with a particular hardware unit in number of hardware units 609. Information received from number of hardware units 609 may be placed in one of circular buffers 608. As depicted, circular buffers 608 may include, for example, without limitation, inertial measurement unit buffer 632, global positioning system unit buffer 634, pulse position modulation unit buffer 636, sensor 1 unit buffer 638, and/or other suitable buffers.

As depicted in this example, communications process 640 may read the information stored in circular buffers 608. Further, communications process 640 may allow a control layer, such as control layer 124 in FIG. 1, to retrieve the information read from circular buffers 608. In some illustrative examples, communications process 640 may send the information to the control layer.

Figure 7:
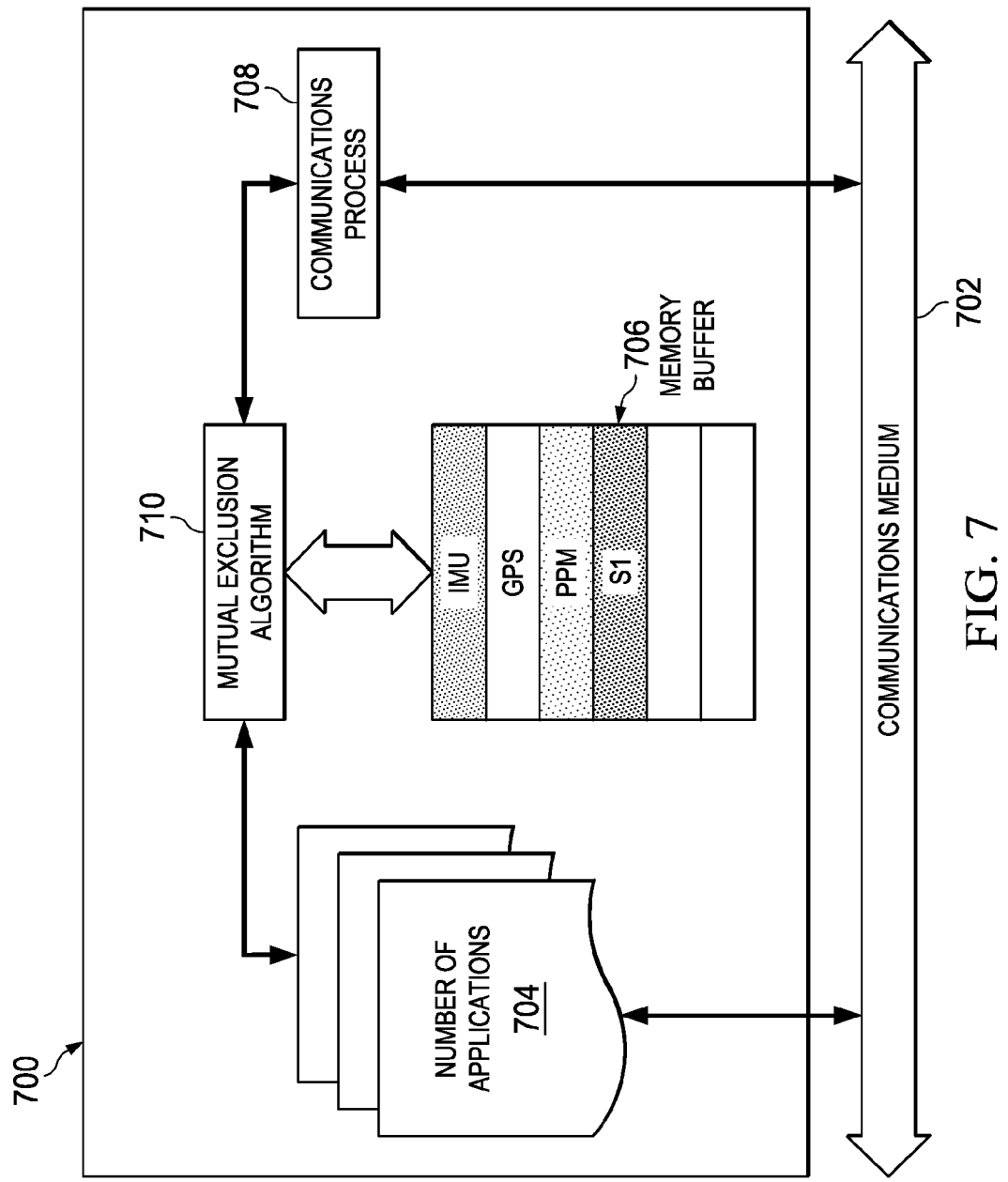
FIG. 7 is an illustration of a control layer in accordance with an advantageous embodiment.

With reference now to FIG. 7, an illustration of a control layer is depicted in accordance with an advantageous embodiment. In this illustrative example, control layer 700 may be an example of one implementation of a portion of control layer 124 in FIG. 1. As depicted, an interface layer, such as interface layer 600 in FIG. 6, may exchange information with control layer 700 through communications medium 702.

Control layer 700 may include number of applications 704, memory buffer 706, and communications process 708. As depicted, communications process 708 may be used to exchange information with communications medium 702 using a protocol, such as first protocol 134 in FIG. 1. For example, without limitation, communications process 708 may retrieve information read from circular buffers 608 in interface layer 600 using communications process 640 in FIG. 6. Information retrieved by communications process 708 may be placed into memory buffer 706. In some illustrative examples, information retrieved by communications process 708 may be decoded and/or parsed prior to placement in memory buffer 706.

In this illustrative example, number of applications 704 may include, for example, without limitation, actuation applications, control applications, navigation applications, guidance applications, testing applications, and/or other suitable types of applications. Number of applications 704 may have access to memory buffer 706. In this manner, number of applications 704 may access information in memory buffer 706 for testing and/or control of a robotic vehicle without having to access the hardware units of the robotic vehicle directly.

Thus, number of applications 704 and the protocol used by number of applications 704 may be kept separate from the hardware of the robotic vehicle and/or the number of protocols used by the hardware of the robotic vehicle. This separation may allow modifications to be made to number of applications 704 without needing to take into account the requirements of the hardware and/or software components of the robotic vehicle. The modifications may include adding, removing, and/or changing portions of number of applications 704. For example, without limitation, a programmer may make modifications to number of applications 704 without having to take into account hardware units, such as number of hardware units 502 in FIG. 5.

As depicted in this example, mutual exclusion algorithm 710 may place limits on the accessibility of memory buffer 706. In other words, in this illustrative example, mutual exclusion algorithm 710 may lock memory buffer 706 such that only one application of number of applications 704 or communications process 708 may access at any given time.

In this manner, mutual exclusion algorithm 710 may lock memory buffer 706 during the reading of information stored in memory buffer 706 and/or during the placing of information in memory buffer 706. Thus, mutual exclusion algorithm 710 may prevent inconsistencies from developing in the information placed into and/or retrieved from memory buffer 706.

Figure 8:
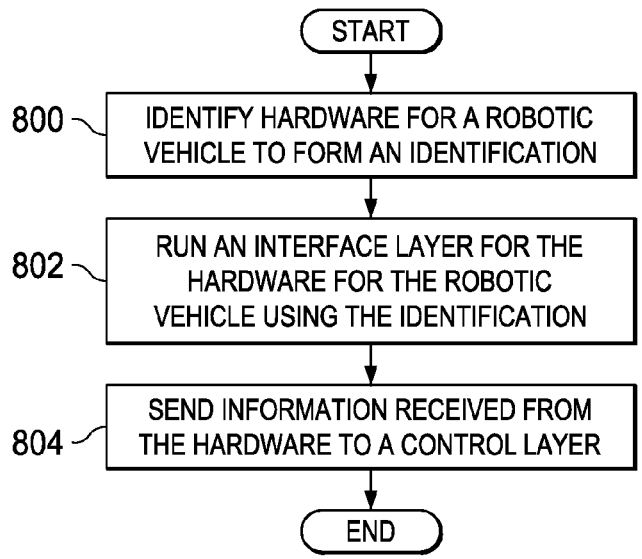
FIG. 8 is an illustration of a flowchart of a process for controlling robotic vehicles in accordance with an advantageous embodiment.

With reference now to FIG. 8, an illustration of a flowchart of a process for controlling robotic vehicles is depicted in accordance with an advantageous embodiment. The process illustrated in FIG. 8 may be implemented in robotic vehicle control environment 100 in FIG. 1.

The process may begin by processor system 108 identifying hardware 106 for robotic vehicle 102 to form an identification (operation 800). Processor system 108 may then run interface layer 126 for hardware 106 for robotic vehicle 102 using the identification (operation 802). Interface layer 126 may be configured to receive information 130 from hardware 106. Information 130 may be received using number of protocols 168 used by hardware 106.

Thereafter, processor system 108 may send information 130 received from hardware 106 to control layer 124 (operation 804), with the process terminating thereafter. Control layer 124 may have number of applications 132 running in processor system 108 to control operation of robotic vehicle 102. In operation 804, information 130 may be received in control layer 124 using first protocol 134 used by number of applications 132.

Figure 9:
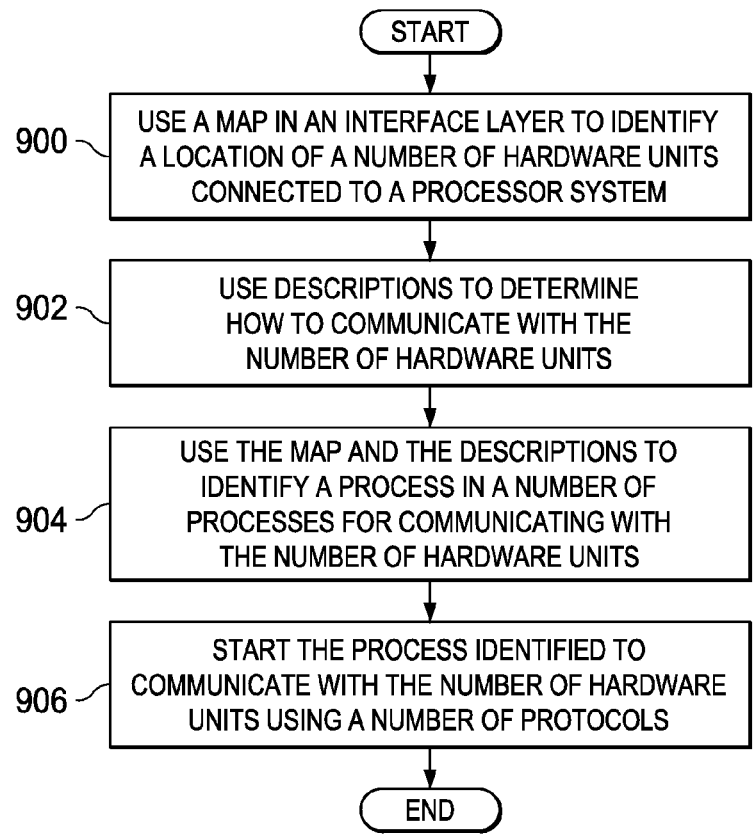
FIG. 9 is an illustration of a flowchart of a process for accessing a number of hardware units in accordance with an advantageous embodiment.

With reference now to FIG. 9, an illustration of a flowchart of a process for accessing a number of hardware units is depicted in accordance with an advantageous embodiment. The process illustrated in FIG. 9 may be implemented in robotic vehicle control environment 100 in FIG. 1. This process may be implemented using interface layer 126 and number of hardware units 107. Further, this process may be implemented for number of hardware units 202 in robotic vehicle 200 in FIG. 2.

The process may begin by using map 150 in interface layer 126 to identify a location of number of hardware units 107 connected to processor system 108 (operation 900). Thereafter, the process may use descriptions 152 to determine how to communicate with number of hardware units 107 (operation 902).

Number of processes 154 may use map 150 and descriptions 152 to identify a process in number of processes 154 for communicating with number of hardware units 107 (operation 904). The process identified may be a process in number of application programming interfaces 166. Further, the process identified in operation 904 may take into account number of protocols 168 for number of hardware units 107. In other words, the process identified may be used to communicate with a particular hardware unit in number of hardware units 107 using a corresponding protocol for the particular hardware unit in number of protocols 168.

Thereafter, the process may start the process identified to communicate with number of hardware units 107 using number of protocols 168 (operation 906), with the process terminating thereafter.

Figure 10:
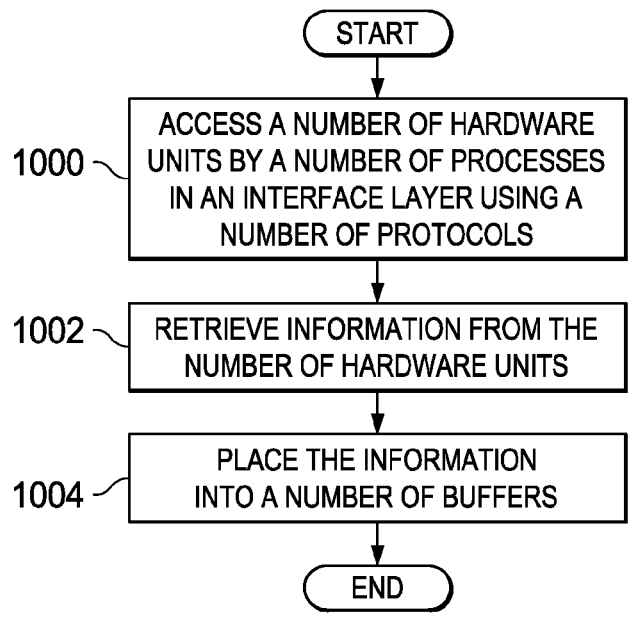
FIG. 10 is an illustration of a flowchart of a process for retrieving and storing information from a number of hardware units in accordance with an advantageous embodiment.

With reference now to FIG. 10, an illustration of a flowchart of a process for retrieving and storing information from a number of hardware units is depicted in accordance with an advantageous embodiment. The process illustrated in FIG. 10 may be implemented in robotic vehicle control environment 100 in FIG. 1. This process may be implemented using interface layer 126 and number of hardware units 107. Further, this process may be implemented for number of hardware units 202 in robotic vehicle 200 in FIG. 2.

The process may begin by number of processes 154 in interface layer 126 accessing number of hardware units 107 using number of protocols 168 (operation 1000). Access to number of hardware units 107 may be achieved using a process, such as the process illustrated in FIG. 9. In other words, the process in number of processes 154 identified in operation 904 in FIG. 9 may be used to access number of hardware units 107. The process may then retrieve information 130 from number of hardware units 107 (operation 1002). Information 130 may be retrieved from, for example, without limitation, sensor system 110.

Thereafter, the process may place information 130 into number of buffers 156 (operation 1004), with the process terminating thereafter.

Figure 11:
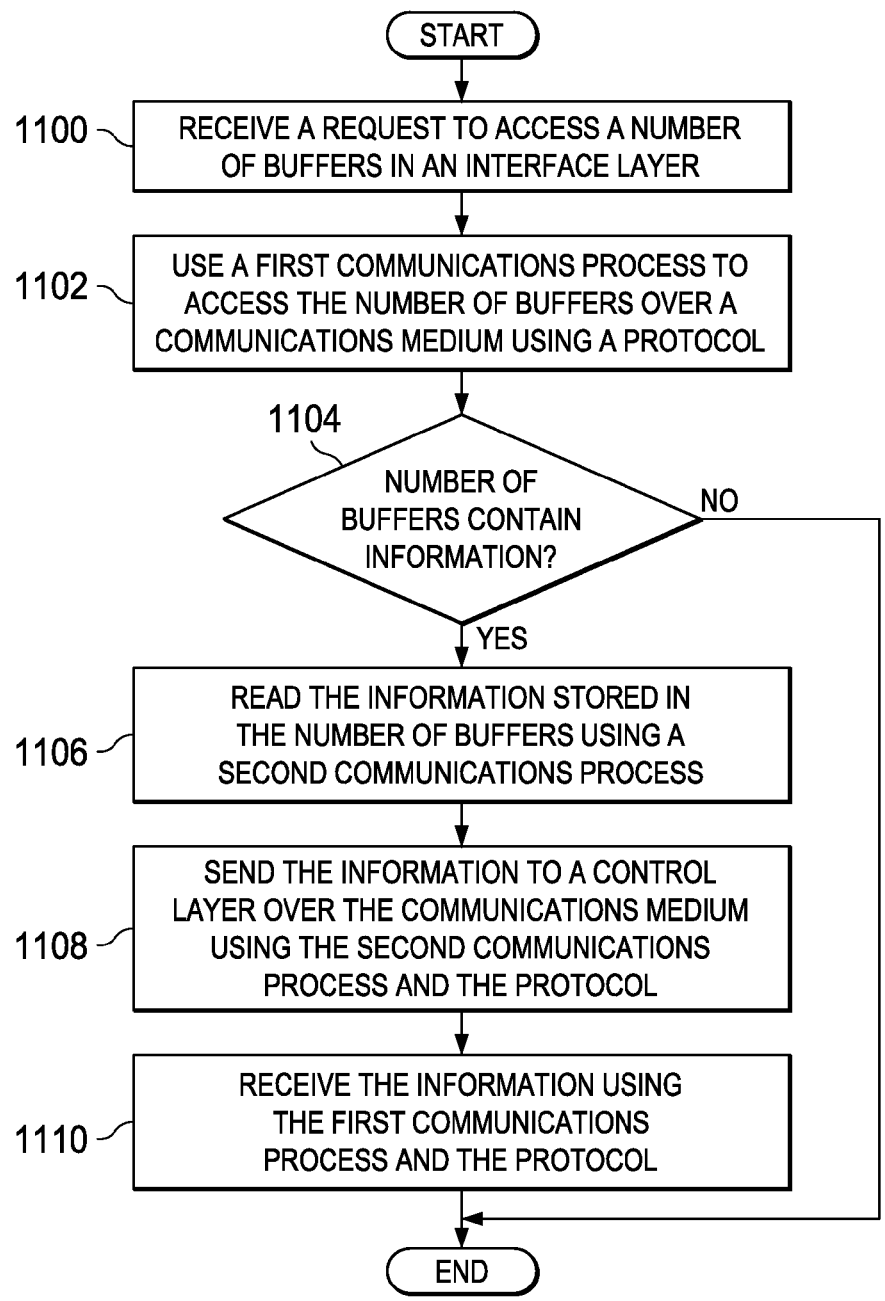
FIG. 11 is an illustration of a flowchart of a process for retrieving information from a number of buffers in accordance with an advantageous embodiment.

With reference now to FIG. 11, an illustration of a flowchart of a process for retrieving information from a number of buffers is depicted in accordance with an advantageous embodiment. The process illustrated in FIG. 11 may be implemented in robotic vehicle control environment 100 in FIG. 1. This process may be implemented using interface layer 126 and control layer 124 in FIG. 1. Further, this process may be implemented for robotic vehicle 200 in FIG. 2.

The process may begin by receiving a request to access number of buffers 156 in interface layer 126 (operation 1100). This request may be received from operator 131. In some advantageous embodiments, the request may be received automatically based on a recurring interval of time. The process may then use first communications process 138 to access number of buffers 156 over communications medium 128 using first protocol 134 (operation 1102). The process may then determine whether number of buffers 156 contains information 130 (operation 1104). If number of buffers 156 does not contain information 130, the process may terminate. Otherwise, the process may read information 130 stored in number of buffers 156 using second communications process 172 (operation 1106).

Thereafter, the process may send information 130 to control layer 124 over communications medium 128 using second communications process 172 and first protocol 134 (operation 1108). Control layer 124 may receive information 130 using first communications process 138 and first protocol 134 (operation 1110), with the process terminating thereafter.

Figure 12:
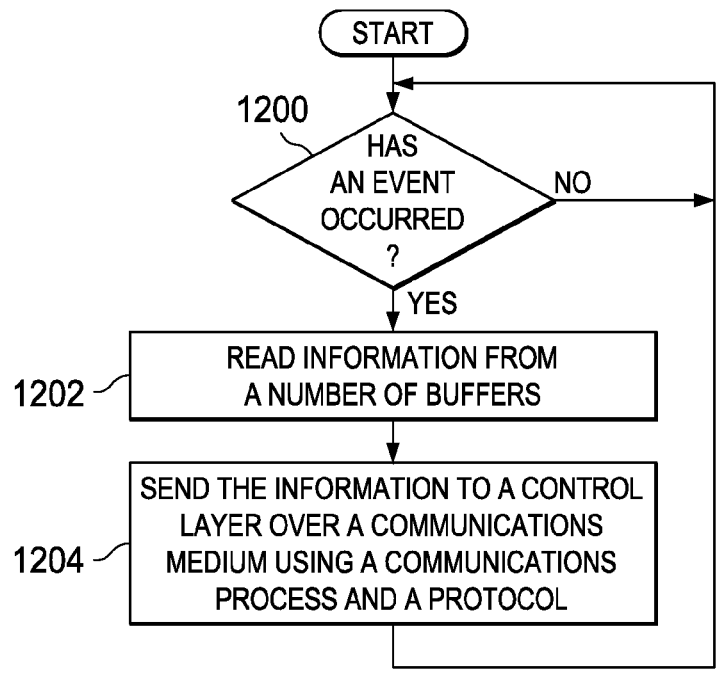
FIG. 12 is an illustration of a flowchart of a process for sending information from an interface layer to a control layer based on an event in accordance with an advantageous embodiment.

With reference now to FIG. 12, an illustration of a flowchart of a process for sending information from an interface layer to a control layer based on an event is depicted in accordance with an advantageous embodiment. The process illustrated in FIG. 12 may be implemented in robotic vehicle control environment 100 in FIG. 1. This process may be implemented using interface layer 126 and control layer 124 in FIG. 1. Further, this process may be implemented for robotic vehicle 200 in FIG. 2.

The process may begin by determining whether an event has occurred (operation 1200). The event may be, for example, without limitation, a recurring time interval, a set time, the satisfying of a condition, and/or some other suitable type of event. Second communications process 172 in interface layer 126 may monitor for the occurrence of the event. As one illustrative example, interface layer 126 may continuously retrieve information 130 from number of hardware units 107 and place information 130 into number of buffers 156. The event may be selected such that operator 131 may retrieve information 130 from number of buffers 156 based on the occurrence of the event. For example, without limitation, operator 131 may retrieve information 130 about every second.

If an event has occurred, the process may then read information 130 from number of buffers 156 (operation 1202). Thereafter, the process may send information 130 to control layer 124 over communications medium 128 using second communications process 172 and first protocol 134 (operation 1204), with the process returning to operation 1200 thereafter. With reference again to operation 1200, if an event has not occurred, the process returns to operation 1200, as stated above.

Figure 13:
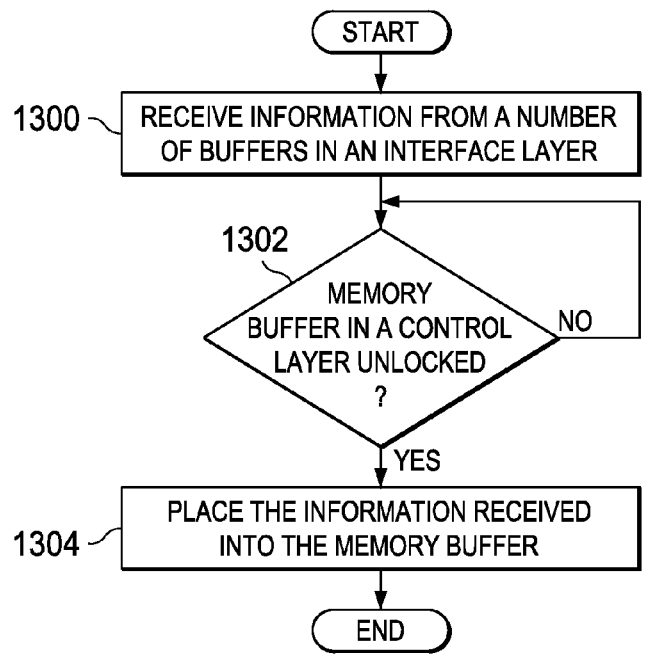
FIG. 13 is an illustration of a flowchart of a process for retrieving and storing information in a control layer in accordance with an advantageous embodiment.

With reference now to FIG. 13, an illustration of a flowchart of a process for retrieving and storing information in a control layer is depicted in accordance with an advantageous embodiment. The process illustrated in FIG. 13 may be implemented in robotic vehicle control environment 100 in FIG. 1. This process may be implemented using control layer 124 and interface layer 126 in FIG. 1. Further, this process may be implemented for robotic vehicle 200 in FIG. 2.

The process may begin by retrieving information 130 from number of buffers 156 in interface layer 126 (operation 1300). Information 130 may be retrieved by first communications process 138 using the process illustrated in FIG. 11.

Thereafter, the process may determine whether a memory buffer in control layer 124 is unlocked (operation 1302). This determination may be made by using, for example, without limitation, mutual exclusion algorithm 710 in FIG. 7. The memory buffer may take the form of memory buffer 706 in FIG. 7. If memory buffer 706 is locked, the process may then return to operation 1302 until memory buffer 706 is unlocked. In some advantageous embodiments, control layer 124 may initiate a process to unlock memory buffer 706. If memory buffer 706 is unlocked, the process may then place information 130 retrieved in operation 1300 into memory buffer 706 (operation 1304), with the process terminating thereafter.

Figure 14:
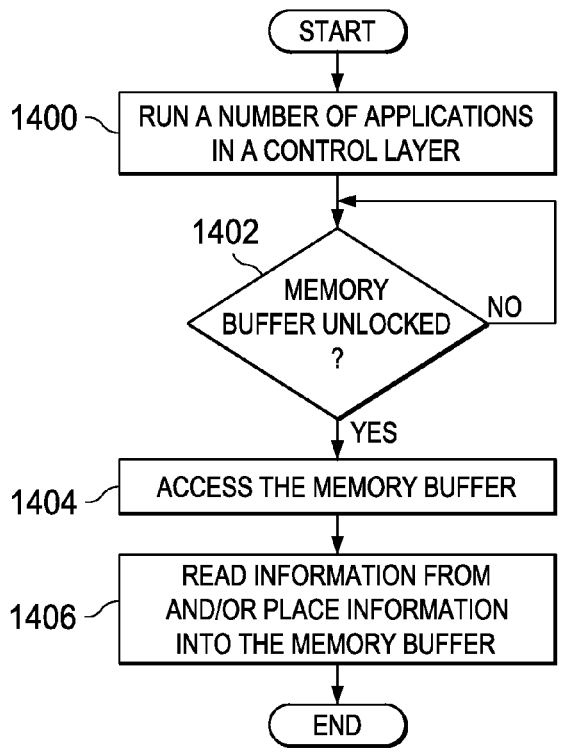
FIG. 14 is an illustration of a flowchart of a process for running applications in a control layer in accordance with an advantageous embodiment.

With reference now to FIG. 14, an illustration of a flowchart of a process for running applications in a control layer is depicted in accordance with an advantageous embodiment. The process illustrated in FIG. 14 may be implemented in robotic vehicle control environment 100 in FIG. 1. This process may be implemented using control layer 124. Further, this process may be implemented for robotic vehicle 200 in FIG. 2.

The process may begin by running number of applications 132 in control layer 124 (operation 1400). The process may then determine whether a memory buffer, such as memory buffer 706 in FIG. 7, is unlocked (operation 1402). If memory buffer 706 is locked, the process may return to operation 1402 until memory buffer 706 is unlocked. Otherwise, the process may access memory buffer 706 (operation 1404). Thereafter, the process may read information 130 from and/or place information 130 into memory buffer 706 (operation 1406), with the process terminating thereafter.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments may provide a method and apparatus for controlling robotic vehicles. In one advantageous embodiment, a processor system may identify hardware for a robotic vehicle to form an identification. The processor system may then run an interface layer for the hardware for the robotic vehicle using the identification. The interface layer may be configured to receive information from the hardware. The information may be received using a number of protocols for the hardware. The processor system may send the information received from the hardware to a control layer in which a number of applications running in the control layer may be configured to indirectly control operation of the robotic vehicle. The information may be received in the control layer using a protocol used by the number of applications.

Thus, a number of the advantageous embodiments provide a software architecture for controlling robotic vehicles. The layers in software architecture do not need to take into account the particular hardware components and/or protocol for the robotic vehicles. As a result, the running of a number of applications and the development of the number of applications may not depend on the particular hardware components being used in controlling the robotic vehicle in different environments.

The different advantageous embodiments may take the form of an entirely hardware embodiment, an entirely software embodiment, or an embodiment containing both hardware and software elements. Some embodiments may be implemented in software, which includes, but is not limited to, forms such as, for example, firmware, resident software, and microcode.

Furthermore, the different embodiments may take the form of a computer program product accessible from a computer-usable or computer-readable medium providing program code for use by, or in connection with, a computer or any device or system that executes instructions. For the purposes of this disclosure, a computer-usable or computer-readable medium can generally be any tangible apparatus that can contain, store, communicate, propagate, or transport the program for use by, or in connection with, the instruction execution system, apparatus, or device.

The computer usable or computer-readable medium may be, for example, without limitation, an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer-usable or computer-readable medium may contain or store a computer-readable or usable program code such that when the computer-readable or usable program code is executed on a computer, the execution of this computer-readable or usable program code causes the computer to transmit another computer-readable or usable program code over a communications link. This communications link may use a medium that is, for example, without limitation, physical or wireless.

A data processing system suitable for storing and/or executing computer-readable or computer-usable program code will include one or more processors coupled directly or indirectly to memory elements through a communications fabric, such as a system bus. The memory elements may include local memory employed during actual execution of the program code, bulk storage, and cache memories which provide temporary storage of at least some computer-readable or computer-usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters and are just a few of the currently available types of communications adapters.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a control layer configured to control hardware for a robotic vehicle by indirectly exchanging information with the hardware using a first protocol;
an interface layer configured to exchange the information with the hardware and the control layer using a communications medium, in which the interface layer exchanges the information with the control layer using the first protocol and exchanges the information with the hardware using a number of protocols used by the hardware in which the interface layer comprises a map of the hardware; descriptions of how to communicate with the hardware; a number of processes configured to communicate with the hardware using the descriptions and the map; and a number of buffers in which the number of processes is configured to retrieve the information from the hardware, and place the information in the number of buffers; and a processor system, in which the control layer, the communications medium, and the interface layer run on the processor system.

2. The apparatus of claim 1 further comprising:
the hardware for the robotic vehicle.

3. The apparatus of claim 1, wherein the interface layer comprises:
the map of the hardware;
descriptions of how to communicate with the hardware; and
the number of processes configured to communicate with the hardware using the descriptions and the map.

4. The apparatus of claim 3, wherein the map of the hardware identifies a location of the hardware in the robotic vehicle.

5. The apparatus of claim 3, wherein the descriptions of how to communicate with the hardware comprises at least one of a packet size, a checksum, a data transfer rate, a device driver location, and an identification of the number of processes that communicate with the hardware.

6. The apparatus of claim 3, wherein the interface layer further comprises:
the number of buffers, wherein the number of processes is configured to receive the information from the hardware and place the information in the number of buffers.

7. The apparatus of claim 6, wherein the number of buffers is selected from one of a number of circular buffers and a number of first-in-first-out buffers.

8. The apparatus of claim 6 further comprising:
a communications process configured to read the information from the number of buffers and send the information read from the number of buffers to another communications process in the control layer over the communications medium using the first protocol.

9. The apparatus of claim 3, wherein the descriptions of how to communicate with the hardware comprise an extensible markup language file and wherein the number of processes is a number of application programming interfaces.

10. The apparatus of claim 1, wherein the control layer comprises:
a number of applications configured to indirectly control the hardware using the first protocol; and
a communications process configured to exchange information with the communications medium using the first protocol.

11. The apparatus of claim 1, wherein the communications medium comprises at least one of a universal serial bus, a wireless communications link, an optical cable, and a wire cable.

12. The apparatus of claim 1, wherein the hardware includes a sensor system located remotely to the robotic vehicle.

13. A control system for a robotic vehicle, the control system comprising:
the robotic vehicle;
hardware associated with the robotic vehicle;
a processor system for use with the robotic vehicle;
a control layer configured to run on the processor system and to control the hardware for the robotic vehicle by indirectly exchanging information with the hardware using a first protocol in which the control layer comprises a number of applications configured to indirectly control the hardware using an interface layer and using the first protocol; and a communications process configured to exchange information with the interface layer using a communications medium;
the interface layer configured to run on the processor system and exchange the information with the hardware and the control layer using the communications medium, in which the interface layer exchanges the information with the control layer using the first protocol and exchanges the information with the hardware using a number of protocols used by the hardware in which the interface layer comprises a map of the hardware; descriptions of how to communicate with the hardware; a number of processes configured to communicate with the hardware using the descriptions and the map; and a number of buffers in which the number of processes is configured to retrieve the information from the hardware and place the information in the number of buffers and in which the map of the hardware identifies a location of the hardware in the robotic vehicle and the descriptions of how to communicate with the hardware comprise at least one of a packet size, a checksum, a data transfer rate, a device driver location, and an identification of the number of processes that communicate with the hardware; and
the processor system, in which the control layer, the communications medium, and the interface layer run on the processor system.

14. A method for controlling robotic vehicles, the method comprising:
identifying, by a processor system, hardware for a robotic vehicle to form an identification;
running, on the processor system, an interface layer for the hardware for the robotic vehicle using the identification in which the interface layer is configured to receive information from the hardware in which the information is received using a number of protocols for the hardware;
sending, by the processor system, the information received from the hardware to a control layer in which a number of applications running in the control layer are configured to indirectly control operation of the robotic vehicle in which the information is received in the control layer using a protocol used by the number of applications;
receiving the information in the interface layer from the number of applications in the control layer in which the information is received using the protocol, wherein the interface layer comprises a map of the hardware, descriptions of how to communicate with the hardware, and a number of processes configured to communicate with the hardware using the descriptions and the map; and
sending the information received from the number of applications in the interface layer to the hardware using the number of protocols for the hardware.

15. The method of claim 14, wherein the descriptions of how to communicate with the hardware comprise at least one of a packet size, a checksum, a data transfer rate, a device driver location, and an identification of the number of processes that communicate with the hardware.

16. The method of claim 14, wherein the interface layer further comprises a number of buffers and wherein the number of processes is configured to retrieve the information from the hardware and place the information in the number of buffers.

17. The method of claim 16 further comprising:
sending the information read from the number of buffers to the control layer over a communications medium using the protocol.

18. The method of claim 14, wherein the control layer comprises the number of applications configured to indirectly control the hardware using the protocol and a communications process configured to exchange the information with a communications medium.

19. A method for controlling robotic vehicles using a control system, the method comprising:

identifying, by a processor system, hardware for a robotic vehicle to form an identification;

running, on the processor system, an interface layer for the hardware for the robotic vehicle using the identification in which the interface layer comprises a map of the hardware; descriptions of how to communicate with the hardware in which the descriptions comprise at least one of a packet size, a checksum, a data transfer rate, a device driver location, and an identification of a number of processes that communicate with the hardware; the number of processes configured to communicate with the hardware using the descriptions and the map; and a number of buffers in which the number of processes is configured to receive information from the hardware using a number of protocols for the hardware and place the information in the number of buffers, and in which the interface layer is configured to receive the information from the hardware in which the information is received;

sending, by the processor system, the information received from the hardware and read from the number of buffers to a control layer over a communications medium using a protocol in which the control layer comprises a number of applications configured to indirectly control the hardware using the protocol and a communications process configured to exchange the information with the communications medium, in which the number of applications running in the control layer is configured to indirectly control operation of the robotic vehicle, and in which the information is received in the control layer using the protocol used by the number of applications;

receiving, by the processor system, the information in the interface layer from the number of applications in the control layer in which the information is received using the protocol; and sending, by the processor system, the information received from the number of applications in the interface layer to the hardware using the number of protocols for the hardware.

* * * * *